(12) United States Patent
Tang et al.

(10) Patent No.: US 11,008,234 B2
(45) Date of Patent: May 18, 2021

(54) REACTORS AND METHODS FOR PRODUCING AND RECOVERING EXTRACELLULAR METAL OR METALLOID NANOPARTICLES

(71) Applicant: The Florida State University Research Foundation, Inc., Tallahassee, FL (US)

(72) Inventors: Youneng Tang, Tallahassee, FL (US); Gang Chen, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 17 days.

(21) Appl. No.: 16/225,397

(22) Filed: Dec. 19, 2018

(65) Prior Publication Data

US 2019/0194040 A1 Jun. 27, 2019

Related U.S. Application Data

(60) Provisional application No. 62/609,585, filed on Dec. 22, 2017.

(51) Int. Cl.
*C02F 1/467* (2006.01)
*C02F 1/58* (2006.01)
(Continued)

(52) U.S. Cl.
CPC ............ *C02F 1/4676* (2013.01); *C02F 1/42* (2013.01); *C02F 1/58* (2013.01); *C02F 3/005* (2013.01);
(Continued)

(58) Field of Classification Search
CPC .. C02F 1/4676; C02F 2101/4676; H01M 8/16
See application file for complete search history.

(56) References Cited

U.S. PATENT DOCUMENTS

2014/0054209 A1* 2/2014 Adams .................... C02F 3/005
                                                              210/150
2014/0083933 A1* 3/2014 Choi ....................... H01M 8/16
                                                              210/603
(Continued)

OTHER PUBLICATIONS

Altringer et al., "Biological and Chemical Selenium Removal from Precious Metals Solutions," U.S. Bureau of Mines, Salt Lake City Research Center, Ch. 19.
(Continued)

*Primary Examiner* — Salil Jain
(74) *Attorney, Agent, or Firm* — Eversheds Sutherland (US) LLP

(57) ABSTRACT

Systems and methods for treating a metal or metalloid ion-contaminated liquid are provided. The method may include (i) feeding the metal or metalloid ion-contaminated liquid into a bioelectrochemical reactor containing a bacteria selected by the cathode to produce extracellular metal or metalloid nanoparticles; and (ii) operating the bioelectrochemical reactor anaerobically to reduce the metal or metalloid ions in the metal or metalloid ion-contaminated liquid to extracellular metal or metalloid nanoparticles. The method may further include separating the metal or metalloid nanoparticles from the bacteria with no energy input. A bioelectrochemical reactor system for production of extracellular metal and metalloid nanoparticles may include a bioelectrochemical reactor, a separation device, and a tangential flow filtration unit.

14 Claims, 12 Drawing Sheets

(51) Int. Cl.
*C02F 1/42* (2006.01)
*C02F 3/00* (2006.01)
*C02F 101/30* (2006.01)
*C02F 101/10* (2006.01)
*C02F 101/22* (2006.01)

(52) U.S. Cl.
CPC .. *C02F 2001/425* (2013.01); *C02F 2101/106* (2013.01); *C02F 2101/22* (2013.01); *C02F 2101/30* (2013.01)

(56) References Cited

U.S. PATENT DOCUMENTS

2014/0263043 A1* 9/2014 Mehta ................ C02F 9/00
                                                210/610
2014/0299821 A1* 10/2014 Rudhardt ........... C09D 11/52
                                                252/514

OTHER PUBLICATIONS

Chung et al., "Bioreduction of Selenate Using a Hydrogen-Based Membrane Biofilm Reactor," Environ. Sci. Tech., 2006, 40 (5):1664-1671.

Hunter W.J., "Removing Selenate from Groundwater with a Vegetable Oil-Based Biobarrier," Curr. Microbiol., 2006, 53 (3):244-248.

Jain et al., "Biogenic Selenium Nanoparticles: Production, Characterization and Challenges," Biotechnology, Nano Biotechnology, Studium Press LLC, USA 2014, 10:361-390.

Kumar et al., "The Ins and Outs of Microorganism-Electrode Electron Transfer Reactions," Nature Reviews Chemistry, 2017, 1 (0024):1-13.

Lai et al., "Nitrate Shaped the Selenate-Reducing Microbial Community in a Hydrogen-Based Biofilm Reactor," Environ. Sci. Tech., 2014, 48 (6):3395-3402.

Lai et al., "Selenate and Nitrate Bioreductions Using Methane as the Electron Donor in a Membrane Biofilm Reactor," Environ. Sci. Tech., 2016, 50 (18):10179-10186.

Lawson et al., "Bioremediation of Selenite in Oil Refinery Wastewater," Appl. Microbiol. Biotechnol., 1995, 43(4):762-65.

Pearce et al., "Investigating Different Mechanisms for Biogenic Selenite Transformations: Geobacter Sulfurreducens, Shewanella Oneidensis and Veillonella Atypica," Environmental Technology 2009, 30 (12):1313-1326.

Van Ginkel et al., "Hydrogen-Based Nitrate and Selenate Bioreductions in Flue-Gas Desulfurization Brine," J. Environ. Eng. 2010, 137 (1):63-68.

Van Ginkel et al., "The Removal of Selenate to Low PPB Levels from Glue Gas Desulfurization Brine Using the H 2-Based Membrane Biofilm Reactor (MBfR)," Bioresource Technology 2011, 102, (10), 6360-64.

Zhang et al., "Towards Selenium Recovery: Biocathode Induced Selenate Reduction to Extracellular Elemental Selenium Nanoparticles," Chem. Eng. J. 2018, 351:1095-1103.

Zhang et al. "Chemical-Free Recovery of Elemental Selenium from Selenate-Contaminated Water by a System Combining a Biological Reactor, a Bacterium-Nanoparticle Separator, and a Tangential Flow Filter," Environ. Sci. Tech., 2018, 52(22):13231-13238.

* cited by examiner

REACTORS AND METHODS FOR PRODUCING AND RECOVERING EXTRACELLULAR METAL OR METALLOID NANOPARTICLES

CROSS-REFERENCE TO RELATED APPLICATIONS

This application claims priority to U.S. Provisional Application No. 62/609,585, filed on Dec. 22, 2017, which is incorporated herein by reference in its entirety.

BACKGROUND

Metal ions and metalloid ions are essential trace elements for humans and animals. However, when presenting in water at high concentrations, they are often toxic and can cause diseases, disorders, or conditions, such as hair loss and reproductive failure. Consequently, metal and metallloid ion contamination represent a potential health hazard. Selenium (Se) is one such element, and can be used to exemplify the hazards of metal and metalloid contamination. The maximum contaminant level set by U.S. Environmental Protection Agency for Se in drinking water is 50 µg Se/L. Selenium contamination in water is commonly caused by the disposal of agricultural drainage in the western U.S. with seleniferous soils, and in wastewater from industries such as oil refining, mining, power generation, and biogeochemical reactions. For example, in the San Joaquin Valley at California, the typical selenium concentration in agricultural drainage ranges from 84 to 4,200 µg/L, and can approach 6000 µg/L.

Selenium exists in the contaminated water as selenate ($SeO_4^{2-}$, VI), selenite ($SeO_3^{2-}$, IV), selenide ($Se^{2-}$, -II), and elemental selenium ($Se^0$). Selenate is predominant under most conditions. Physiochemical processes such as ion exchange and reverse osmosis can separate selenate from water via resins or membranes, creating a selenate-rich residual that should be further treated or disposed of. Biological processes can remove selenate by reducing selenate to elemental selenium nanoparticles via a redox reaction. An electron donor such as hydrogen gas or organic matter is externally supplied to drive the redox reaction. The elemental selenium nanoparticles and biomass can then be removed from the water. Recovered selenium nanoparticles are a potential valuable resource that can be used in various industries such as in the production of glass, alloys and steel, the manufacturing of oils and rubber, and the development of batteries and solar cells.

Bacteria in conventional biological reactors primarily reduce selenate ($SeO_4^{2-}$) in selenate-contaminated water to intracellular elemental selenium nanoparticles. Recovery of the intracellular selenium nanoparticles is challenging due to high chemical and energy demands for separating the intracellular selenium from the biomass components.

Accordingly, there remains a need for improved methods and equipment for reducing selenate and separation of the resulting selenium. For example, it would be desirable to provide methods and systems that are more efficient, have low energy requirements, reduce the reliance on chemicals for separation, and/or overcome one or more of the foregoing disadvantages regarding selenate reduction and selenium separation.

BRIEF SUMMARY

In one aspect, systems and methods for treating a metal or metalloid ion-contaminated liquid are provided. The method may include (i) feeding the metal or metalloid ion-contaminated liquid into a bioelectrochemical reactor containing a bacteria selected to produce extracellular metal or metalloid nanoparticles; and (ii) operating the bioelectrochemical reactor anaerobically to reduce the metal or metalloid ions in the metal or metalloid ion-contaminated liquid to extracellular metal or metalloid nanoparticles. The method may further include separating the metal or metalloid nanoparticles from the bacteria with no energy input. The bacteria may be selected by the cathode.

In another aspect, a bioelectrochemical reactor system is provided for the production of extracellular metal and metalloid nanoparticles. The bioelectrochemical reactor system may include: an anode chamber which comprises a bacteria-coated anode; a cathode chamber which comprises a bacteria-coated cathode; a cation exchange membrane in fluid communication with, and separating, the anode chamber and the cathode chamber; a source of an electron donor substance configured for supplying the electron donor substance into the anode chamber; a source of metal or metalloid ion-contaminated medium configured to pump the medium through the cathode chamber; and an external resistor in a circuit with the anode and the cathode, wherein the bioelectrochemical reactor is configured to operate anaerobically and reduce the metal or metalloid ions in the metal or metalloid ion-contaminated medium to extracellular metal or metalloid nanoparticles.

In yet another aspect, a method is provided for reducing metal ions to extracellular metal nanoparticles or metalloid ions to metalloid nanoparticles. The method may include: providing a bioelectrochemical reactor system, such as the one described in the preceding paragraph; actuating the circuit to provide a voltage between the anode and the cathode; contacting the cathode and the anode with the metal or metalloid ion-contaminated medium; and feeding the electron donor substance into the anode chamber, wherein the contacting and feed rates are effective to cause extracellular metal or metalloid producing bacteria to reduce the metal or metalloid ions in the metal or metalloid ion-contaminated medium to extracellular metal or metalloid nanoparticles.

In still another aspect, a device is provided for separating extracellular metal or metalloid nanoparticles from biomass components. The device may include a vertically elongated vessel which comprises an inlet about an upper end of the vessel for receiving a medium comprising a mixture of bacteria and extracellular metal or metalloid nanoparticles, an outlet about the upper end of the vessel opposite the inlet for discharge of the medium from the vessel, and an outlet about the lower end of the vessel for discharge of the biomass from the vessel; and a plate comprising a plurality of pores to permit the passage of water but not the passage of the nanoparticles or bacteria agglomerates, wherein the plate is disposed within the vessel at an angle relative to flow of the medium through the vessel such the bacteria will agglomerate and roll off of the plate and the nanoparticles will adhere to the plate.

DETAILED DESCRIPTION

Figure 1:
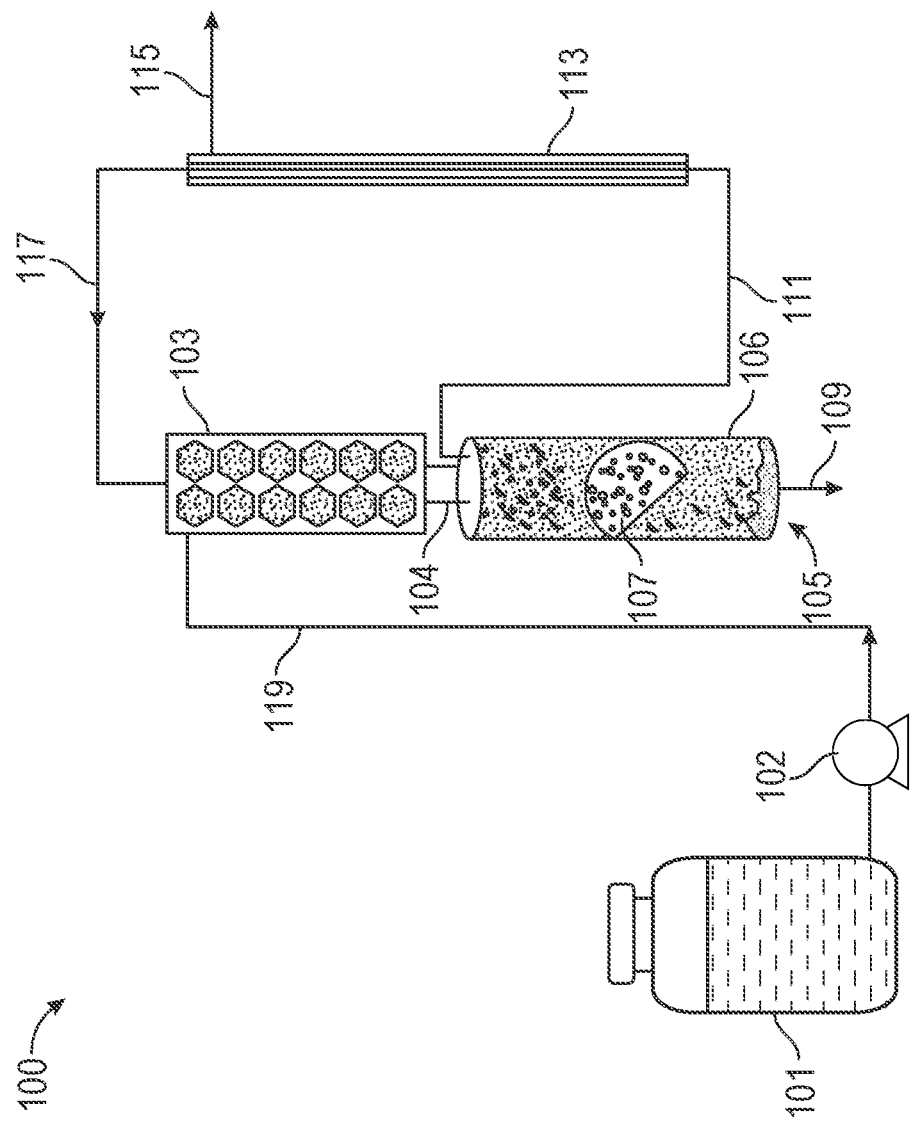
FIG. 1 depicts a schematic illustration of a system for producing and recovering extracellular metal or metalloid nanoparticles according to an embodiment of the present disclosure.

Systems and methods have been developed for treating a metal ion-contaminated or metalloid ion-contaminated liquid, for example to remove and recover selenium metal and ions from water. The method may include (i) feeding the metal or metalloid ion-contaminated liquid into a bioelectrochemical reactor containing a bacteria selected to produce extracellular metal or metalloid nanoparticles; (ii) operating the bioelectrochemical reactor anaerobically to reduce the metal ions in the metal or metalloid ion-contaminated liquid to extracellular metal or metalloid nanoparticles; and optionally thereafter, separating the metal or metalloid nanoparticles from the bacteria. The systems and methods advantageously have been developed to select bacteria that produce only extracellular metal or metalloid nanoparticles, so as to advantageously avoid the need for additional processing, including cell lysis, to separate the intracellular nanoparticles from the bacteria and biomass. For example, the bacteria may be selected as is described in Zhang et al., *Towards Selenium Recovery: Biocathode Induced Selenate Reduction to Extracellular Elemental Selenium* Nanoparticles, Chem. Eng. J. 351 (2018) 1095-1103, which is incorporated herein in its entirety. Specifically, it has been discovered that microorganisms that can survive on the cathode and reduce selenate are extracellular selenium-producing bacteria, such as *Geobacter sulfurreducens* and *Shewanella oneidensis*, so that the bioelectrochemical reactor itself can be used to select for extracellular selenium-producing bacteria. In fact, using the systems and methods disclosed herein, the separation can be performed with no energy input.

In embodiments, the bioelectrochemical reactor is used as a selector to select only bacteria that produce extracellular metal or metalloid nanoparticles from an electrode inoculum comprising a highly diverse mixed culture. As a result, the bioelectrochemical reactors and systems provided herein are able to serve as an effective means for removing metal or metalloid ions from contaminated water and separating the produced metal or metalloid ions, e.g., selenium nanoparticles, from contaminated water.

Metal or Metalloid Ion Reduction

In one aspect, a bioelectrochemical reactor system is provided for reducing metal or metalloid ions to metal or metalloid nanoparticles. The bioelectrochemical reactor system includes a bioelectrochemical reactor which may include two chambers, a cathode, an anode, an electron donor, and a medium containing metal or metalloid ions. In some embodiments, the electron donor is acetate. In a particular embodiment, the metalloid ion being reduced is selenate ($SeO_4^{2-}$). In some embodiments, the bioelectrochemical reactor system includes a separator device. In some embodiments, the bioelectrochemical reactor system includes a tangential flow filtration unit.

In another aspect, a method is provided for reducing metal ions to metal nanoparticles or metalloid ions to metalloid nanoparticles. The method may include (i) inoculating the cathode and the anode of a bioelectrochemical reactor with a contaminated medium including a microbial consortium, (ii) transferring the electrodes to the cathode and anode chamber, respectively, (iii) contacting the inoculated electrodes with the medium containing the metal or metalloid ion to be reduced, and (iv) operating the two chambers in a continuous flow mode. In some embodiments, the method further includes passing a bioelectrochemical reactor effluent to a separator device to produce a separator device effluent with a lower concentration of the contaminant and biomass than the bioelectrochemical reactor effluent. In some embodiments, the method may further include passing the separator device effluent to a tangential flow filtration unit to produce a tangential flow filtration unit effluent which has a lower concentration of the contaminant and biomass than the separator device effluent. In some embodiments, the tangential flow filtration unit may also produce a retentate which may be recycled to the bioelectrochemical reactor.

In some embodiments, a bioelectrochemical reactor for production of extracellular metal and metalloid nanoparticles is provided. In embodiments, the bioelectrochemical reactor includes (i) an anode chamber which includes a bacteria-coated anode; (ii) a cathode chamber which includes a bacteria-coated cathode; (iii) a cation exchange membrane in fluid communication with, and separating, the anode chamber and the cathode chamber; (iv) a source of an electron donor substance configured for supplying the electron donor substance into the anode chamber; (v) a source of metal or metalloid ion-contaminated medium configured to pump the medium through the cathode chamber; and (iv) an external resistor in a circuit with the anode and the cathode. In embodiments, the bioelectrochemical reactor is configured to operate anaerobically and reduce the metal or metalloid ions in the metal or metalloid ion-contaminated medium to extracellular metal or metalloid nanoparticles.

In some embodiments, a method for reducing metal or metalloid ions to extracellular metal or metalloid nanoparticles is provided. In embodiments, the method includes (i) providing a bioelectrochemical reactor as described above; (ii) actuating the circuit to provide a voltage between the anode and the cathode; (iii) contacting the cathode and the anode with the metal or metalloid ion-contaminated medium; and (iv) feeding the electron donor substance into the anode chamber. In embodiments, the contacting and feed rates are effective to cause extracellular metal or metalloid producing bacteria to reduce the metal or metalloid ions in the metal or metalloid ion-contaminated medium to extracellular metal or metalloid nanoparticles.

In some embodiments, the metal or metalloid ion-contaminated medium is fed continuously through the cathode chamber. In some embodiments, the electron donor substance is fed continuously through the anode chamber. In some embodiments, the flow rate of the electron donor is sufficient to maintain an amount equal to or greater than the stoichiometric ratio between the electron donor and the metal or metalloid ion.

In some embodiments, the contaminated medium includes or consists of an aqueous liquid, e.g., contaminated water. In some embodiments, the metalloid ion to be reduced is selenate ($SeO_4^{2-}$). In some embodiments, the metal or metalloid to be reduced includes palladium.

In some embodiments, one or both of the anode and the cathode are carbon cloth electrodes, as known in the art.

In some embodiments, the electron donor substance includes acetate, propionate, methanol, ethanol, glucose, or any combination thereof.

In some embodiments, the continuous flow rate of about 0.2 L/day, corresponding to a metal ion loading rate of 330 mg metal/$m^2$-day, is used. However, other flow rates and metal ion loading rates may be used. The flow rate and metal loading rate may be optimized to achieve a desired reactor efficiency.

Metal and Metalloid Nanoparticle Separation from Biomass

In still another aspect, devices and methods are provided for separating the metal or metalloid nanoparticles from the biomass components that eliminate the need for energy and/or chemical-intensive separation methods.

In some embodiments, the device includes a column and an angled plate that includes pores effective to permit water to pass through the plate. Generally, the angled plate is configured to separate the metal or metalloid nanoparticles from the bacteria and other biomass components.

In some embodiments, the cathode chamber is fitted with an angled plate below the cathode and above the effluent flow line. In some embodiments, the angled plate is configured to facilitate adherence of the nanoparticles to the plate during downward medium flow, while the bacteria and other biomass components aggregate to form big flocs that will roll off of the plate (due to a gravitational force), thereby separating the nanoparticles from the bacteria and other biomass components. In some embodiments, the plate is formed of or coated with a polymeric material, which preferably is one particularly suited to adhere the metal or metalloid nanoparticles to it. For example, the plate, or at least an exterior (upper) surface of it, may be formed of or coated with a polyethylene, polymethylmethacrylate (PMMA), or nylon. In some embodiments, the plate is positioned at an angle from about 40 to about 50 degrees (e.g., 45°) relative to the direction of flow of the medium.

In some embodiments, the bioelectrochemical reactor further includes a separator device for separating the extracellular metal or metalloid nanoparticles from bacteria in the medium. For example, in some embodiments, the separator device includes a plate positioned in a flow of the medium exiting the cathode chamber. In some embodiments, the separator device includes a vertically elongated vessel in which the plate is disposed. In some embodiments, the plate includes a plurality of pores to permit the passage of water through the plate but not the passage of the nanoparticles or the bacteria agglomerates. For example, in some embodiments, the plate includes a polymeric surface on which the nanoparticles will adhere. Without intending to be bound by any particular theory, it is believed that the surface energy and hydrophilicity of the material of the plate will determine whether the nanoparticles will adhere. For example, the plate may be formed of or coated with one or more suitable polymeric materials, such as polyethylene, polymethylmethacrylate (PMMA), nylon, or a combination thereof. In some embodiments, the plate is angled relative to the flow of the medium such that the bacteria will agglomerate and roll off of the plate. In some embodiments, the vessel includes an inlet about an upper end of the vessel for receiving the medium containing a mixture of bacteria and the nanoparticles, and an outlet about the upper end of the vessel, but on the opposite side of the inlet, for discharge of the medium from the vessel. In some embodiments, the vessel further includes an outlet at the bottom of the vessel for discharging biomass when biomass accumulation is significant.

In one aspect, a device for separating extracellular metal or metalloid nanoparticles from biomass components is provided. In some embodiments the device includes (i) a vertically elongated vessel which has an inlet about an upper end of the vessel for receiving a medium that includes a mixture of bacteria and extracellular metal or metalloid nanoparticles, an outlet about the upper end of the vessel and opposite the inlet for discharge of the medium from the vessel; and (ii) a plate including a plurality of pores to permit the passage of water but not the passage of the nanoparticles or bacteria agglomerates. In some embodiments, the device further includes an outlet at the bottom of the vessel for discharging biomass when biomass accumulation is significant. The plate is disposed within the vessel at an angle relative to flow of the medium through the vessel such the bacteria will agglomerate and roll off of the plate and the nanoparticles will adhere to the plate. In some embodiments, the plate includes a polymeric surface, for example, polyethylene. In some embodiments, the vertically elongated vessel is a gravity column and the plate is positioned an angle from about 25 to about 65 degrees, relative to the longitudinal axis of the column. For example, the angle may be about 25 degrees, about 30 degrees, about 40 degrees, about 45 degrees, about 50 degrees, about 60 degrees, about 65 degrees, or any ranges therebetween.

Without intending to be bound by any particular theory, it is believed that the settling velocities ($V_S$) for bacteria and selenium nanoparticles (SeNPs) on the plate can be calculated based on Stokes' Law:

$$V_s = \frac{g}{18\mu}(\rho - \rho_0)d^2$$

wherein g is the gravitational acceleration (9.8 m/s$^2$), $\mu$ is the dynamic viscosity of water at 25° C., $\rho$ is the density of the settling particle (4.8×10$^3$ kg/m$^3$ for SeNPs and 1.1×10$^3$ kg/m$^3$ for bacteria), $\rho_0$ is the density of water, and d is the diameter of the settling particle. Without intending to be bound by any particular theory, it is believed that for bacteria, d varies from about 1.0 μm to about 300 μm, and that for SeNPs, d varies from about 0.2 μm to about 5 μm.

Without intending to be bound by any particular theory, it is believed that the criterion of rolling can be mathematically determined by the torque balance value T, according to the following equation:

$$T=[(G-F_b)\times\sin\theta]\times R-[F^{LW}+(G-F_b)\times\cos\theta]\times\lambda$$

wherein G is the gravity force, $F_b$ is the buoyant force, $F^{LW}$ is the Lifshitz-van der Walls attraction force, $\theta$ is the angle of the sheet, and $\lambda$ is the water decay length of 0.06 nm. Settling velocities and rolling behavior are described in more detail in Zhang et al. *Chemical-Free Recovery of Elemental Selenium from Selenate-Contaminated Water by a System Combining a Biological Reactor, a Tangential Flow Filter, and a Bacterium-Nanoparticle Separator*, Environmental Sci. Technol., 2018 Nov. 20; 52(22):13231-38.

Over time when in use, the metal or metalloid ion contaminants (e.g., selenium nanoparticles) will accumulate on the plate, and the plate may be periodically removed from the separator and replaced with a new plate. The metal or metalloid nanoparticles may then be harvested from the removed plate using various means known in the art. The harvested metals or metalloids may then be processed for re-use or otherwise disposed of in an appropriate manner.

FIG. 1 is a schematic illustration of a system 100 and method for reducing metal or metalloid ions to metal or metalloid nanoparticles and separating the metal or metalloid nanoparticles from biomass. The system 100 includes a source 101 of a metal or metalloid ion-contaminated medium which is fed by a pump 102 through line 119 to a bioelectrochemical reactor 103, which produces a reactor effluent 104 when in use. The medium is generally water or another aqueous liquid. The reactor effluent 104 is transferred to a separator device 105 in fluid communication with the bioelectrochemical reactor 103. The separator device 105 includes a vertically elongated vessel 106 in which a collector plate 107 is removably fixed. The plate 107 includes a plurality of pores to permit the passage of water but not the passage of the nanoparticles or bacteria agglomerates. In use, the separator device 105 produces a first effluent 109, including bacteria and biomass for disposal, and a second effluent 111, including bacteria, biomass, metal or metalloid ion contaminants, and metal or metalloid nanoparticles. The first effluent, which is generally biomass substantially or completely free of the metal contaminants, is then disposed of appropriately. The second effluent flows to a tangential flow unit 113. In use, the tangential flow unit 113 produces a first tangential flow unit effluent 115, which consists essentially of the medium without the metal ion contaminants, and a second tangential flow effluent 117 (the tangential flow filter retentate), which may include biomass, metal or metalloid ion contaminants, and metal or metalloid. The second tangential flow effluent 117 is recirculated to the bioelectrochemical reactor 103.

Figure 2:
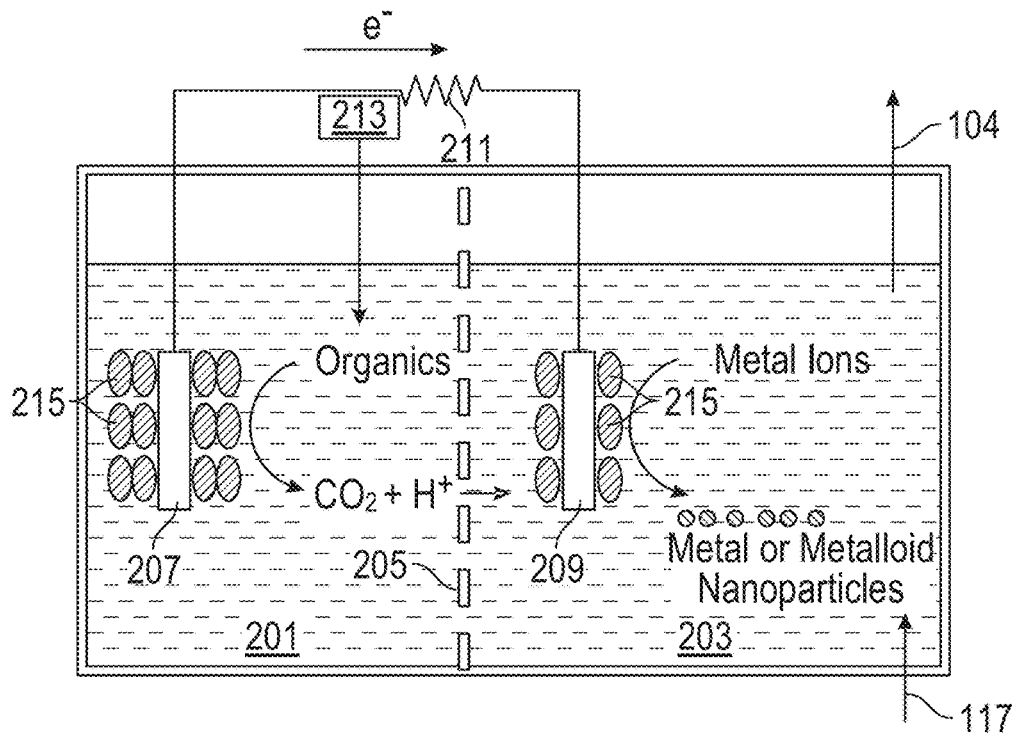
FIG. 2 depicts a schematic illustration of a bioelectrochemical reactor according to one embodiment of the present disclosure.

A more detailed schematic of the bioelectrochemical reactor 103 is shown in FIG. 2. As can be seen from this figure, the bioelectrochemical reactor 103 includes an anode chamber 201 and a cathode chamber 203, separated from each other by a cation exchange membrane 205 in fluid communication with the anode chamber 201 and the cathode chamber 203. The bioelectrochemical reactor 103 further includes an anode 207 and a cathode 209 in a circuit with an external resistor 211. The bioelectrochemical reactor 103 further includes a source of an electron donor substance 213 configured for supplying the electron donor substance into the anode chamber. The electron donor substance may be metered or otherwise fed into the anode chamber via a second pump (not shown). As shown in this figure, both the anode 207 and cathode 209 are coated in bacteria 215.

Unless otherwise defined, all technical and scientific terms and abbreviations used herein have the same meaning as commonly understood by one of skill in the art to which this invention pertains. As used herein, the singular forms "a," "an," and "the" include plural referents unless the context clearly dictates otherwise. Thus, for example, reference to "an electron donor" may include mixtures of electron donors, and the like.

EXAMPLES

The present invention may be further understood with reference to the following non-limiting examples.

Example 1—Reduction of Selenate in a Bioelectrochemical Reactor

Reduction of selenate ($SeO_4^{2-}$) in selenate-contaminated water to extracellular elemental selenium nanoparticles in a continuous-flow cathode-based bioelectrochemical reactor fed with acetate as the electron donor was investigated. The following methods demonstrated that selenate in selenate-contaminated water was rapidly reduced with high yield and excellent efficiency.

1. Cathode-Based Bioelectrochemical Reactor Setup

A two-chamber bioelectrochemical reactor (Adams & Chittenden Scientific Glass, USA) was set up in an anaerobic box that was continuously supplied with ultra-high purity nitrogen gas (Airgas, USA). The anaerobic anode and cathode chambers in the bioelectrochemical reactor were separated by a cation exchange membrane (CEM, model CMI-7000, Membranes International Inc., USA). Each chamber had a liquid volume of 290 mL and headspace of 60 mL. A plain carbon cloth electrode (2.5 cm×6 cm, Fuel Cell Store, USA) was used in each chamber. The two electrodes were connected through external wires and an external resistor (100Ω). Four pieces of membrane (100 nm pore diameter, nuclepore track-etched membranes, Whatman, USA) were placed at the bottom of each chamber to collect precipitates for analysis.

2. Operation of the Cathode-Based Bioelectrochemical Reactor

To inoculate, the two electrodes in the bioelectrochemical reactor were soaked in a sealed media bottle filled with municipal wastewater and activated sludge from a local municipal wastewater treatment plant and leachate from a local landfill for 12 days. This was to increase the microbial diversity. The two electrodes were then transferred to the anode and cathode chambers of the bioelectrochemical reactor, respectively. The two chambers were operated in the continuous flow mode at a constant flow rate of 0.2 L/day, corresponding to a selenate loading rate of 330 mg Se/m²-day. This selenium surface loading is higher than the loadings in conventional biofilm reactors (i.e., mainly ranging from one to 140 mg Se/m²-day); thereby allowing the capacity for high efficiency reduction of selenate in the bioelectrochemical reactor to be analyzed. The cathode chamber was fed with a synthetic mineral medium amended with sodium selenate ($Na_2SeO_4$, 5 mg Se/L). The synthetic mineral medium contained $Na_2SO_4$ (22.19 mg/L), $FeCl_2 \cdot 4H_2O$ (2 mg/L), $CaCl_2 \cdot 2H_2O$ (20 mg/L), $MgCl_2 \cdot 6H_2O$ (20 mg/L), $NH_4Cl$ (20 mg/L), $MnCl_2 \cdot 4H_2O$ (0.5 mg/L), $H_3BO_3$ (0.5 mg/L), $ZnCl_2$ (0.5 mg/L), $CoCl_2 \cdot 6H_2O$ (0.5 mg/L), $NiCl_2 \cdot 6H_2O$ (0.5 mg/L), $CuCl_2 \cdot 2H_2O$ (0.1 mg/L), $NaMoO_4 \cdot 2H_2O$ (0.1 mg/L), $Na_2WO_4$ (0.05 mg/L), and four pH buffers, including $KH_2PO_4$ (14 mg/L), $K_2HPO_4$ (17 mg/L), $KHCO_3$ (1000 mg/L) and $NaHCO_3$ (3400 mg/L). The medium was autoclaved for one hour at 121° C. and then degassed for 40 minutes using $N_2$. $CO_2$ gas was simultaneously supplied to maintain pH at 7.0±0.1. The anode chamber was fed with the same mineral medium amended with 10 mg-C/L of sodium acetate ($CH_3COONa$) as the electron donor. The ratio of C:Se was 2:1, which was higher than the stoichiometric ratio of 0.4:1 (according to the following reaction) to ensure that C was not limiting.

$$0.093SeO_4^{2-}+0.125CH_3COO^-+0.022NH_4^++0.19H^+=0.093Se+0.022C_5H_7O_2N+0.037CO_2+0.037HCO_3^-+0.193H_2O$$

3. Chemical Analysis of Bioelectrochemical Reactor Influent and Effluent.

Influent and effluent samples were taken from both chambers in the reactor every three days. The concentrations of the selenium species (dissolved $SeO_4^{2-}$, dissolved $SeO_3^{2-}$, dissolved $Se^{2-}$, total solid Se in the reactor, and total solid Se in the effluent) were measured using methods conventional in the art. $CH_3COO^-$ was measured using Ion Chromatography (IC, Dionex Aquion Ion Chromatography System, USA). Since sulfate reduction and methanogenesis may occur, which affects the electron distribution and interferes with selenate reduction, sulfate in all the samples were also measured usingIon Chromatography (IC, Dionex Aquion Ion Chromatography System, USA). Methane in the headspace of both chambers was measured using Gas Chromatography (GC, model SRI 8610C, SRI Instruments, USA) at steady state. The methane concentrations in the liquid phase were calculated using Henry's Law. The concentrations of the chemical species at steady state were used to estimate the electron distribution in the anode and the cathode chambers, to assist in evaluating reactor performance.

4. Bioelectrochemical Analysis of the Reactor

The voltage across the external resistance (U, V) and the open circuit voltage (OCV, V) were measured by a multimeter (MU 113, Electronic Resources LTD, USA). Based on U, a few reactor performance parameters including the current (I, A), current density ($I_A$, A/m²), power density ($P_A$, W/m²), and coulombic efficiency ($C_E$, dimensionless), were calculated by the following equations:

$$I = \frac{U}{R_{ext}} \qquad \text{Equation 1}$$

$$I_A = \frac{U}{AR_{ext}} \qquad \text{Equation 2}$$

$$P_A = \frac{IU}{A} \qquad \text{Equation 3}$$

$$C_E = \frac{MI}{Fb_eQS} \qquad \text{Equation 4}$$

where $R_{ext}$ is the external resistance (100Ω), A (3×10⁻³ m²) is the surface area of each electrode, M (12 g C/mol acetate) is the molecular weight of the electron donor, F (96,500 Coulomb/mol e⁻) is the Faraday's constant, $b_e$ (4 mol e⁻/mol C) is the electrons provided by oxidation of the electron donor, Q (0.2 L/day) is the flow rate and S (g C/L) is the electron donor concentration consumed in the anode chamber.

To further understand what factors affect the current and how to increase the current and current density to maximize selenate reduction, the current was characterized by Equation 5:

$$I = \frac{OCV - U}{R_{int}} \qquad \text{Equation 5}$$

To estimate the internal resistance ($R_{int}$, Ω) in Equation 5, the external resistance ($R_{ext}$) was varied from 10Ω to 42 kΩ to generate a polarization curve that plots the power density ($P_A$) and the voltage across the external resistance (U) versus a range of current density ($I_A$).

5. Selenate Reduction in the Bioelectrochemical Reactor

Figure 3:
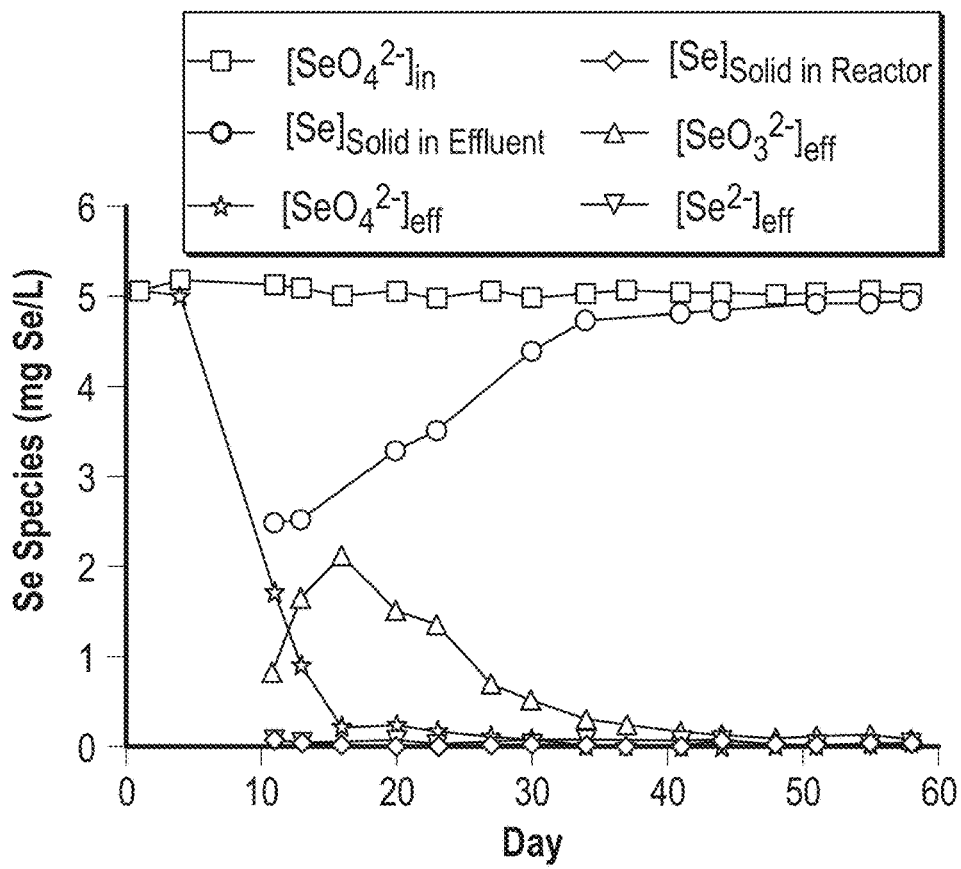
FIG. 3 is a graph which depicts the Se species detected in the influent and effluent from a cathode chamber of a bioelectrochemical reactor according to one embodiment of the present disclosure.

Selenate reduction in the cathode chamber of the bioelectrochemical reactor was due to electron transfer from the anode to the cathode through the external circuit and the subsequent extracellular electron transfer to bacteria on the cathode. As FIG. 3 shows, in the cathode of the reactor, $SeO_4^{2-}$ reduction started within the first four days, rapidly increased to 96% on the 16$^{th}$ day, and reached >99.6% at steady state on the 40$^{th}$ day. Intermediate, $SeO_3^{2-}$ ($[SeO_3^{2-}]_{eff}$, dissolved), reached the maximum of 2 mg Se/L on the 16$^{th}$ day and then gradually dropped to <0.1 mg Se/L at steady state. $Se^{2-}$ ($[Se^{2-}]_{eff}$, dissolved production was negligible. The selenium difference between the influent $SeO_4^{2-}$ ($[SeO_4^{2-}]_{in}$) and all the dissolved effluent selenium ($[SeO_4^{2-}]_{eff}+[SeO_3^{2-}]_{eff}+[Se^{2-}]_{eff}$) represent the selenium converted to solids ($[Se]_{solid}$).

Table 1 compares the bioelectrochemical reactor with conventional biofilm reactors. With a selenate removal rate higher than 99.6%, the selenium surface loading in the bioelectrochemical reactor corresponds to about 330 mg Se/m²-day, which is close to the top of the surface loading rate range for conventional biological reactors (0.29-362 mg $Se/m^2$-day) such as the $H_2$-based membrane biofilm reactor (MBfR), sludge-blanket reactors (SBR) and fluidized bed reactors (FBR). In Table 1 below, Ref. 1 refers to Lawson, S., et al., Bioremediation of selenite in oil refinery wastewater. *Applied Microbiology and Biotechnology* 1995, 43, (4), 762-65; Ref. 2 refers to Hunter, W. J., Removing selenate from groundwater with a vegetable oil-based biobarrier, *Curr. Microbiol.* 2006, 53 (3), 244-248; Ref. 3 refers to Altringer, P.; Lien, R.; Gardner, K. Biological and chemical selenium removal from precious metals solutions. In Environmental Management for the 1990s; Lootens, D. J., Greenslade, W. M., Barker, J. M., Eds.; 1991, pp 135-142; Ref. 4 refers to Lai, et al., Nitrate shaped the selenate-reducing microbial community in a hydrogen-based biofilm reactor. *Environ. Sci. Technol.* 2014, 48 (6), 3395-3402; Ref. 5 refers to refers to Chung, J., et al., Bioreduction of selenate using a hydrogen-based membrane biofilm reactor. *Environmental science & technology* 2006, 40, (5), 1664-1671; Ref. 6 refers to refers to Lai, C.-Y., et al., Selenate and nitrate bioreductions using methane as the electron donor in a membrane biofilm reactor. *Environmental science & technology* 2016, 50, (18), 10179-10186; Ref. 7 refers to Van Ginkel, et al., The removal of selenate to low ppb levels from flue gas desulfurization brine using the H 2-based membrane biofilm reactor (MBfR). *Bioresource technology* 2011, 102, (10), 6360-64; and Ref. 8 refers to Van Ginkel, et al., Hydrogen-based nitrate and selenate bioreductions in flue-gas desulfurization brine. *J. Environ. Eng.* 2010, 137 (1), 63-68, each of which is incorporated herein by reference in its entirety.

TABLE 1

Comparison of the bioelectrochemical reactor with conventional reactors

| Type | Electron Donor | Influent Concentration (mg Se/L) | Effluent Concentration (mg Se/L) | Removal Rate | Surface Loading (mg $Se/m^2$-day) | Ref. |
|---|---|---|---|---|---|---|
| SBR + FBR | Acetate | 3.69 | ~0.12 | 95% | 4.59 | 1 |
| PRB | Soybean Oil | 10 | 1 | 90% | 0.29 | 2 |
| RBC | Peptone | 4.1 | 0.61 | 85% | 41.38 | 3 |
| MBfR | $H_2$ | 1 | ~0.4 | 60% | 90 | 4 |
| MBfR | $H_2$ | 1 | 0.04 | 96% | 132 | 5 |
| MBfR | $CH_4$ | 1 | <0.05 | >95% | 126 | 6 |
| MBfR | $H_2$ | 32 | <1.6 | >95% | 362 | 7 |
| MBfR | $H_2$ | 80 | 0 | 100% | 322 | 8 |

Example 2—Characterization of the Solids Produced in the Bioelectrochemical Reactor To characterize the solid selenium and sulfur species of Example 1, and their interaction with the microorganisms, a few solid samples were taken from the bioelectrochemical reactor at the end of the experiments. The samples included the anode and cathode electrodes, the cation exchange membrane, pieces of nuclepore track-etched membranes placed at the bottom of chambers for collecting precipitates, and the retentate collected by filtering the effluent through a membrane (nuclepore track-etched membranes). Control samples were taken before the experiments were conducted.

The majority of selenium solids were found in the effluent instead of the reactor with the majority of the solid selenium found as elemental selenium nanoparticles suspended in the liquid.

All samples were assayed using Raman spectroscopy, Scanning Electron Microscope (SEM, FEI Nova 400 Nano SEM, FEI, USA), and Energy Dispersive X-Ray (EDX). Before being assayed by the SEM, the samples were pretreated by a procedure involving fixation and critical point drying and coated with Iridium. To determine whether the selenium nanoparticles are intracellular or extracellular, a small piece of cathode electrode was cut, pretreated by fixation and thin-sectioning, and then assayed using Transmission Electron Microscopy (TEM, FEI CM120 TEM, FEI, USA).

1. Scanning Electron Microscope

Figure 4A:
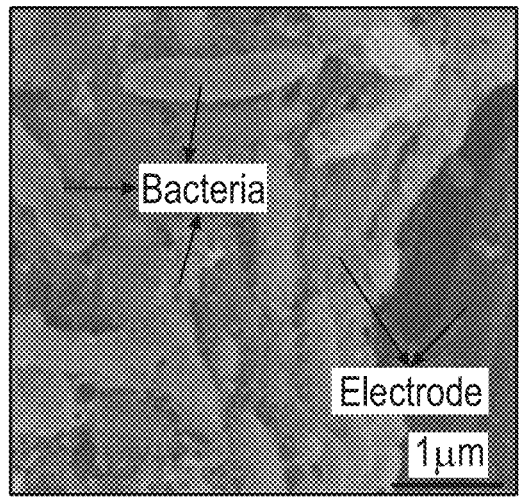
FIG. 4A depicts a Scanning Electron Microscope (SEM) image of the anode electrode in a bioelectrochemical reactor according to one embodiment of the present disclosure.
Figure 4B:
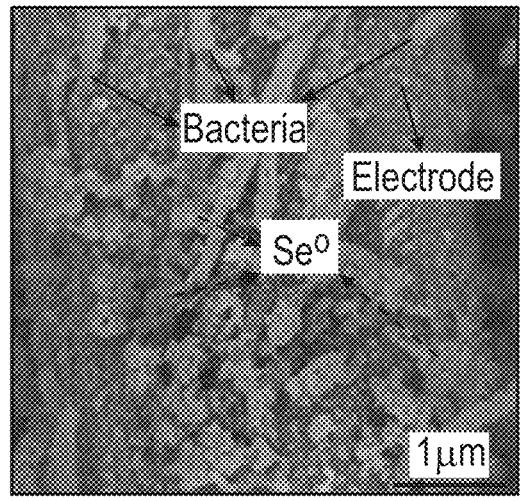
FIG. 4B depicts an SEM image of the cathode electrode in the bioelectrochemical reactor of FIG. 4A.
Figure 4C:
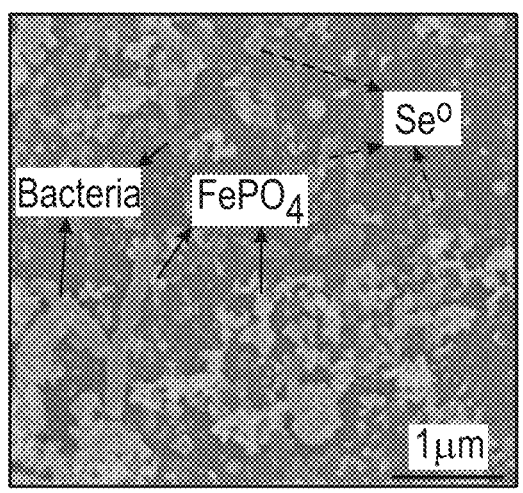
FIG. 4C depicts an SEM image of the solids that precipitated on the membrane at the bottom of the cathode chamber in the bioelectrochemical reactor of FIG. 4A.
Figure 4D:
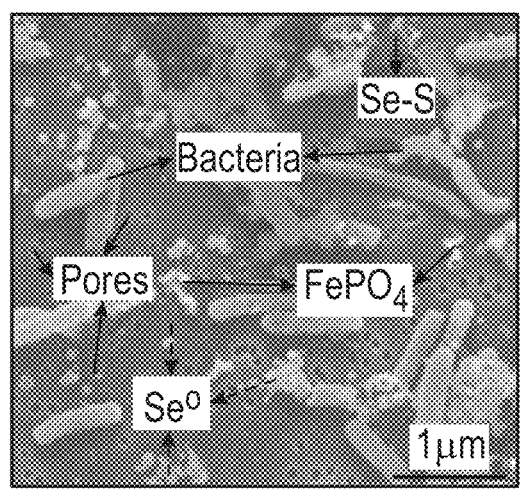
FIG. 4D depicts an SEM image of the solids collected by passing the cathode chamber effluent from the bioelectrochemical reactor of FIG. 4A through a membrane.

FIGS. 4A-4D show representative SEM images of the anode electrode (FIG. 4A), cathode electrode (FIG. 4B), solids that precipitated on the membrane at the bottom of the cathode chamber (FIG. 4C), and solids collected by passing the cathode chamber effluent through a membrane (FIG. 4D). A comparison of the anode (FIG. 4A) and the cathode (FIG. 4B) revealed the cathode having much less biomass, suggesting that only a small portion of the biomass need to be separated from selenium nanoparticles during selenium recovery. Selenium nanoparticles (spherical particles) were observed in all samples from the cathode (FIGS. 4B-D), but not from the anode chamber (FIG. 4A). The selenium nanoparticles at the bottom of the cathode chamber (FIG. 4C, ~500 nm in diameter) were larger than those suspended in the effluent (FIG. 4D, <200 nm in diameter). Consistent with the data in FIG. 3 displaying almost all solid forms of selenium being found in the effluent, a comparison of the amount of solid forms of selenium found on the membrane placed at the bottom of the cathode chamber and the amount collected from passing the cathode effluent through a membrane, shows the majority of the selenium in the effluent. That the majority of the produced solids are in the reactor effluent is clear, especially considering FIG. 4C represents the total amount of solids accumulated at the bottom of the reactor since the beginning of reactor operation, and FIG. 4D only represents the solids suspended in the effluent at the time of sampling.

2. Raman Spectroscopy

Further analysis of the solids in the effluent showed the presence of three types of precipitate. Raman analysis of the majority type consisting of spherical nanoparticles showed peaks at 237 $cm^{-1}$ and 255 $cm^{-1}$, respectively (FIG. 5), corresponding to elemental selenium in two forms, trigonal selenium and amorphous selenium.

Figure 5:
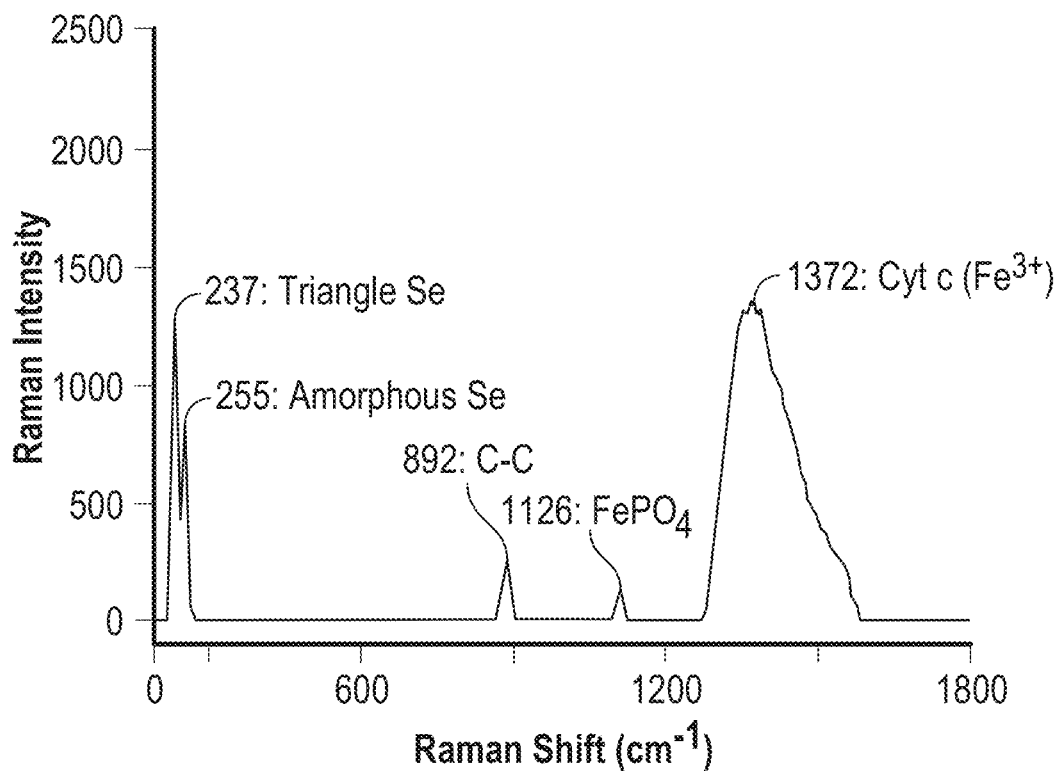
FIG. 5 is a graph that depicts representative Raman shifts for the solids collected after passing the cathode effluent from the bioelectrochemical reactor through a membrane in one embodiment of the present disclosure.

Raman spectroscopy of the second type of precipitate showed a shift at 1126 $cm^{-1}$, corresponding to $FePO_4$ (FIG. 5).

The Raman analysis of the third type of precipitate which was similar to the first type in morphology and size, in two out of 50 tests the presence of Se—S bonds indicating the presence of small amounts of sulfur were shown.

As seen in FIG. 5, the Raman results also indicate the existence of two additional bonds, a C—C bond seen at a shift of 892 $cm^{-1}$ and a bond between Cytochrome c (Cyt c) and $Fe^{3+}$ seen at a shift of 1372 $cm^{-1}$. The presence of the C—C bond could be a result from the specific nuclepore track-etched membrane used in the analysis, as the material for this membrane is polycarbonate. The Cyt c is a protein predominantly located in the periplasmic space. Its presence is key to mediating electron transfer between a solid electrode and a cell, as is described in Kumar, A et al., The ins and outs of microorganism-electrode electron transfer reactions. *Nature Reviews Chemistry* 2017, 1, 0024. It also plays a significant role in the reduction of selenate to extracellular elemental selenium nanoparticles, as is described in Pearce, C. I. et al., Investigating different mechanisms for biogenic selenite transformations: *Geobacter sulfurreducens, Shewanella oneidensis* and *Veillonella atypica. Environmental technology* 2009, 30, (12), 1313-1326 and Jain, R. et al., Biogenic selenium nanoparticles: production, characterization and challenges. *Nanobiotechnology*, Studium Press LLC, USA 2014, 361-90. A recent study showed that Cyt c catalyzed the following reaction.

$$SeO_4^{2-}+1.5(Fe^{II}\text{–Cytochrome c})+8H^+=1.5(Fe^{III}\text{–Cytochrome c})^{4+}+Se^0+4H_2O$$

3. Energy Dispersive X-Ray (EDX)

Figure 6A:
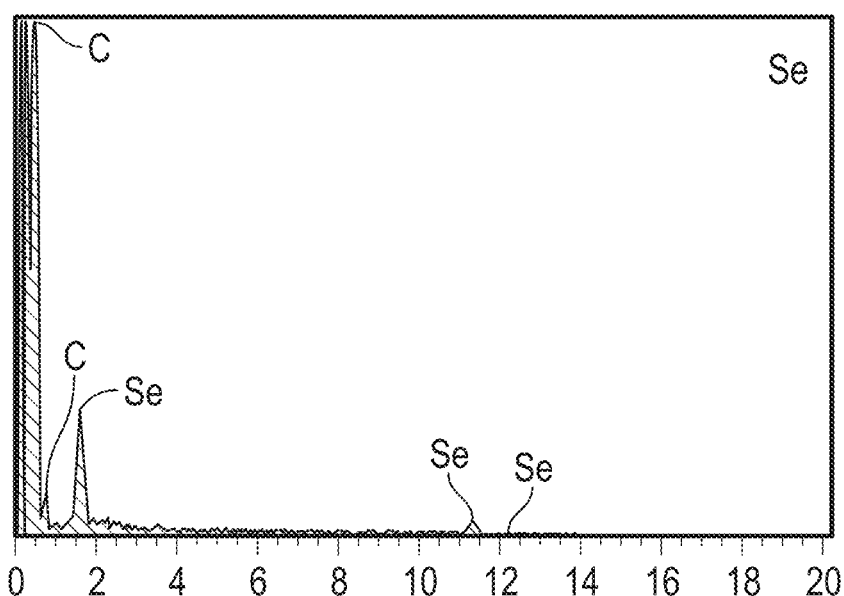
FIG. 6A depicts a representative Energy-Dispersive X-ray (EDX) analysis of the solids collected after passing the cathode effluent the bioelectrochemical reactor through a membrane in one embodiment of the present disclosure, showing elemental selenium.

EDX analysis of the first type of precipitate only showed the presence of selenium (FIG. 6A).

Figure 6B:
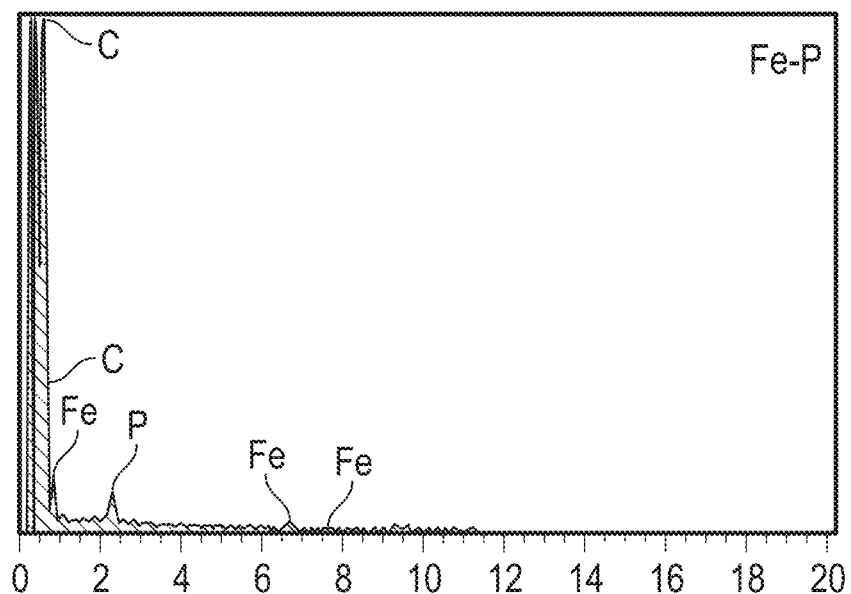
FIG. 6B depicts a representative EDX analysis of the solids collected after passing the cathode effluent the bioelectrochemical reactor through a membrane in one embodiment of the present disclosure, showing $FePO_4$.

The second type of precipitate aggregated and did not have a regular crystal morphology, and EDX analysis of the precipitate showed the presence of Fe and P (FIG. 6B), consistent with the precipitate being $FePO_4$ as seen in the Raman analysis. The presence of $FePO_4$ was a result of a high concentration of iron (0.56 mg Fe/L) and phosphate (6.19 mg P/L) in the synthetic media used for the experiments. The concentrations of Fe and P were orders of magnitude higher than those expected to found in most real world selenium-contaminated waters. Therefore, formation of $FePO_4$ in real world applications of the presented methods is not expected.

Figure 6C:
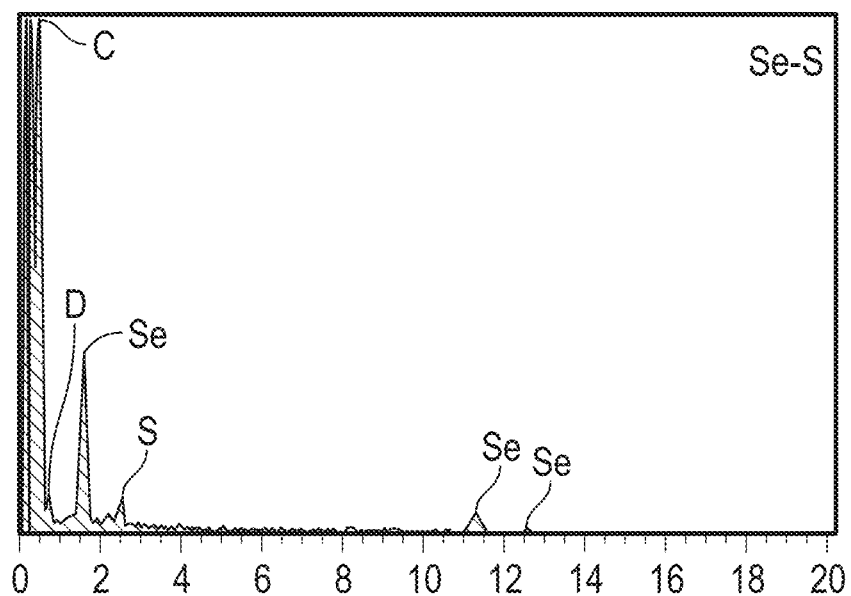
FIG. 6C depicts a representative EDX analysis of the solids collected after passing the cathode effluent the bioelectrochemical reactor through a membrane in one embodiment of the present disclosure, showing selenium sulfide.

The EDX analysis of the third type of precipitate showed the presence of small amounts of sulfur (FIG. 6C), which is consistent with the Raman analysis and the nanoparticles of this precipitate being selenium sulfide.

4. Transmission Electron Microscopy (TEM)

Figure 7:
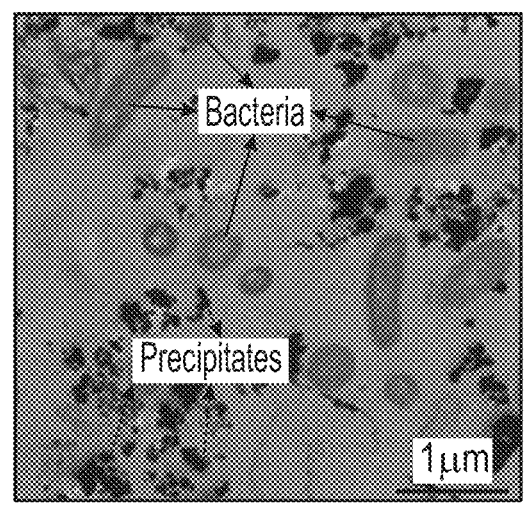
FIG. 7 depicts a representative thin-section Transmission Electron Microscopy (TEM) image of the cathode in one embodiment of the present disclosure.

A representative TEM image of the thin-section of the cathode, seen in FIG. 7, showed that all the electron dense regions (i.e. selenium nanoparticles and other precipitates) are outside of cells, suggesting that the microbes in the cathode produces extracellular selenium only. In other words, the cathode selected microbes from the microbial consortia that only produce extracellular selenium nanoparticles, consistent with the existence of significant Cytochrome c.

Example 3—Characterization of the Bioelectrochemical Reactor Performance

The electrochemical characteristics of the reactor during the reduction of selenate in selenate-contaminated water to extracellular elemental selenium nanoparticles in a continuous-flow cathode-based bioelectrochemical reactor fed with acetate as the electron donor was investigated.

Figure 8A:
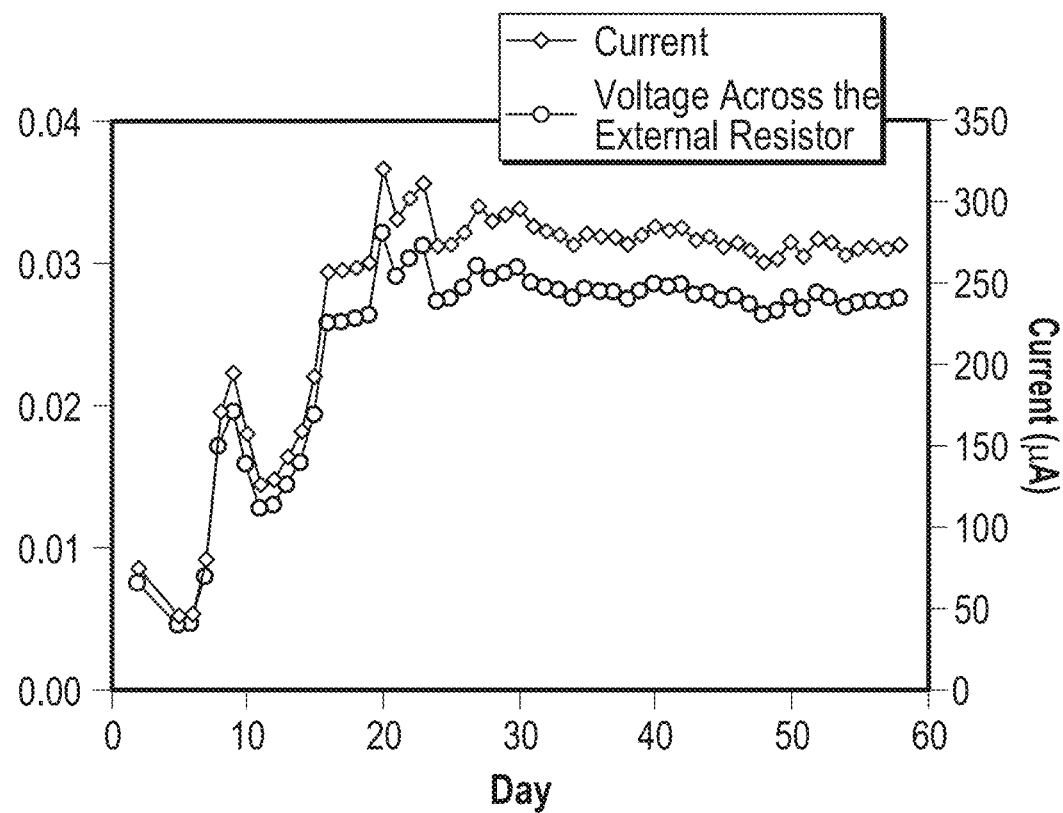
FIG. 8A is a graph that depicts the voltage across the external resistor and the current in the bioelectrochemical reactor in one embodiment of the present disclosure.

1. Characterization of the Current and Voltage in the Bioelectrochemical Reactor The voltage across the 100Ω external resistance and the current in the bioelectrochemical reactor was calculated by Equation 1. As seen in FIG. 8A, the current and voltage gradually increased until reaching the maximum of ~274 μA and ~0.027 V at steady state. The current and voltage increase corresponded very well with the $SeO_4^{2-}$ removal increase seen in FIG. 3.

To understand what factors affect the current and how to maximize the current and current density, the current at steady state was also characterized by Equation 5 as follows:

$$I = \frac{OCV - U}{R_{int}} = \frac{0.181 \text{ V} - 0.027 \text{ V}}{530 \text{ }\Omega} = 2.9 \times 10^{-4} \text{ A} \quad \text{Equation 5}$$

in which, 0.181 V is the OCV measured at steady state, 0.027 V is the voltage across the external resistor at the steady state (See FIG. 8A), and 530Ω is the internal resistance estimated from the polarization curve (FIG. 8B) discussed below. The current calculated from Equation 1 and 5 are consistent, suggesting that the internal resistance is well characterized.

Figure 8B:
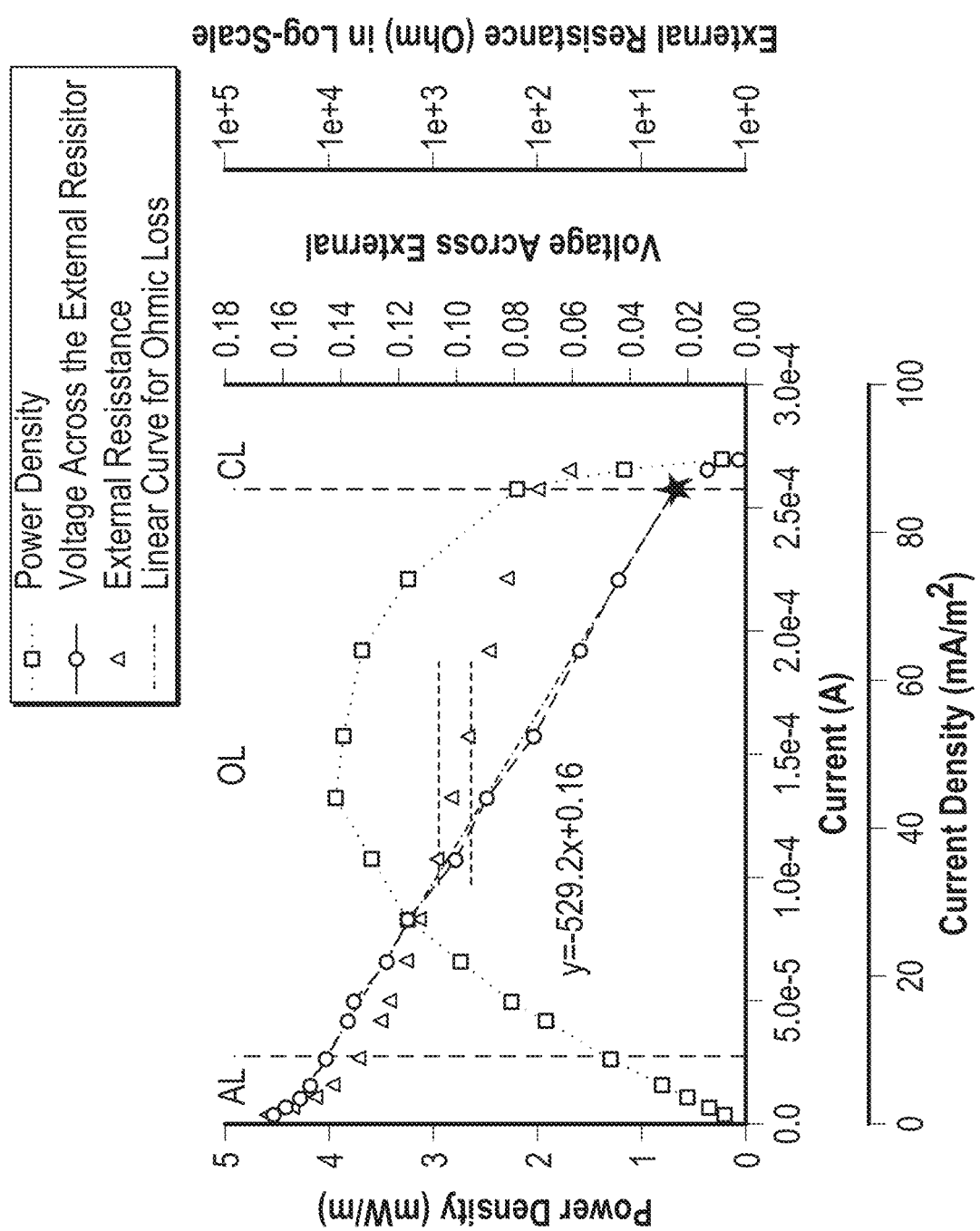
FIG. 8B is a graph that depicts polarization and power density curves of the bioelectrochemical reactor during steady state in one embodiment of the present disclosure.

FIG. 8B shows the polarization and power density curves of the reactor obtained during steady state. The polarization curve has three zones: activation loss (AL), ohmic loss (OL), and concentration loss (CL). The $R_{int}$ is estimated as the slope of the polarization curve at the ohmic loss zone (530Ω). It can also be estimated to be in the range of 470Ω to 940Ω (confined by the two horizontal dashed lines) by the power density curve since the power density is the highest when $R_{ext}$ equals to $R_{int}$.

The current density was determined to be 0.086 A/m² during the steady state. This value is comparable with other cathode reactors with nitrate or chromium as the electron acceptors (0.003-0.123 A/m²). According to the power density curve in FIG. 8B, decreasing the external resistance from 100 to 0Ω could yield a theoretical maximum current density of 0.09 A/m² for this specific reactor, corresponding to a theoretical maximum selenate loading rate of 1065 mg Se/m²-day.

The reactor may be modified to increase the current density and the corresponding selenate loading rate. The open circuit voltage (OCV) may be increased in order to increase the current density. In some embodiments, the internal resistance ($R_{int}$) is decreased to achieve this objective. In some embodiments, the OCV is increased and the $R_{int}$ is decreased to achieve a higher current density.

The internal resistance ($R_{int}$) of 530Ω determined during the steady state for the bioelectrochemical reactor was much higher than most similar bioelectrochemical reactors (4-75Ω), though occasionally similar to others that are due to lack of optimization. The high $R_{int}$ for the reactor is likely due to lack of optimization of operating conditions, since the reactor was operated at the point (i.e., see the star on the polarization curve in FIG. 8B) where concentration loss switched to ohmic loss, resulting in both concentration loss and ohmic loss significantly contributing to the internal resistance. The major cause of the concentration loss was the low acetate concentration (i.e., 10 mg C/L) used in the anode chamber, which was orders of magnitude lower than that reported in the literature. One way to decrease the concentration loss is to simultaneously increase the acetate concentration in the anode chamber and decrease the flow rate to the anode chamber so that the acetate loading rate does not change, and therefore minimize concentration loss and decrease the overall $R_{int}$. The major cause of the ohmic loss in the reactor was likely caused by fouling of the cation exchange membrane (CEM), because the increase of the internal resistance from 250Ω on the 15$^{th}$ day to 530Ω on the 48$^{th}$ day corresponded to significant precipitation of selenium nanoparticles and biomass on the CEM on the 48$^{th}$ day. Therefore, regular cleaning of the CEM should significantly decrease the ohmic loss and the overall $R_{int}$.

The measured OCV (0.181 V) is about one third of the theoretical maximum OCV (overall cell electromotive force ($E_{emf}$) estimated to be 0.548 V). The difference between the theoretical maximum OCV and the measured OCV ($E_{emf}$-OCV=0.367 V) was the electrode overpotential loss due to activation and concentration losses. Therefore methods to decrease activation and concentration losses would decrease the overpotential loss and increase OCV.

2. Characterization of the Electron Balance in the Bioelectrochemical Reactor

Figure 9A:
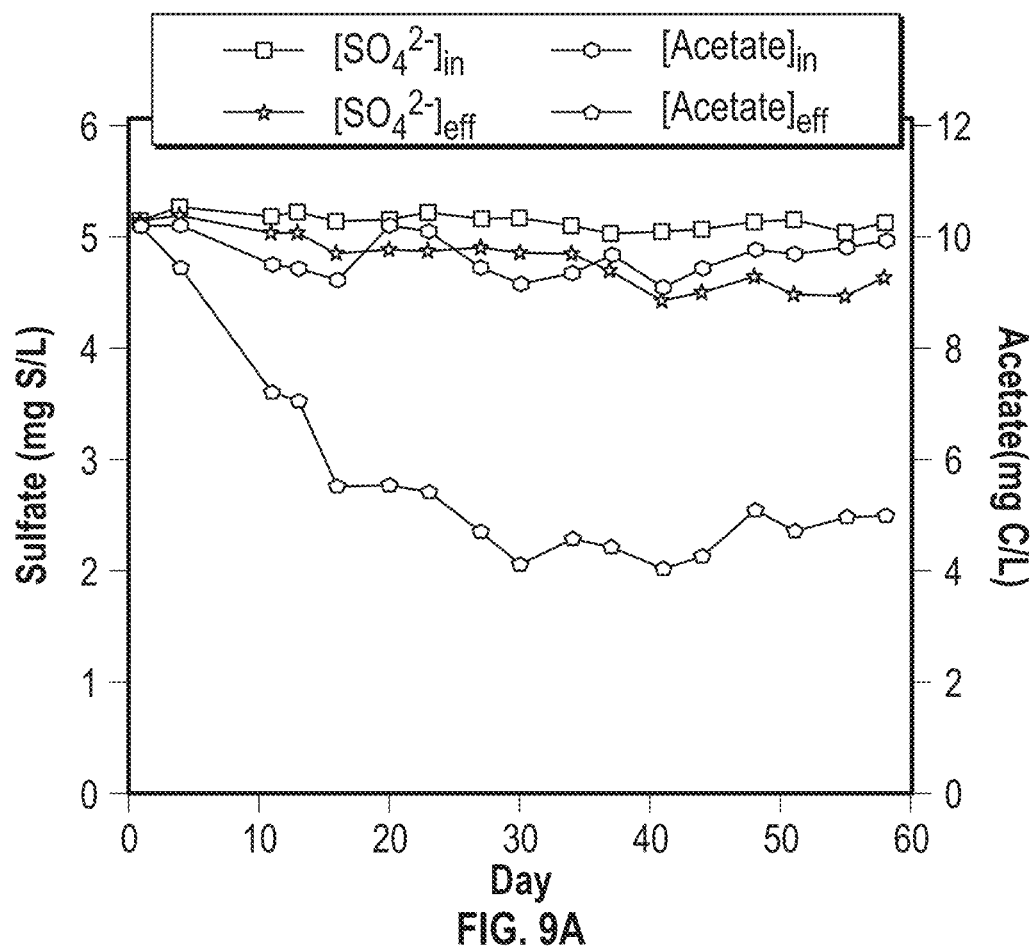
FIG. 9A is a graph that depicts the concentration of acetate and sulfur species in the bioelectrochemical reactor at the anode in one embodiment of the present disclosure.
Figure 9B:
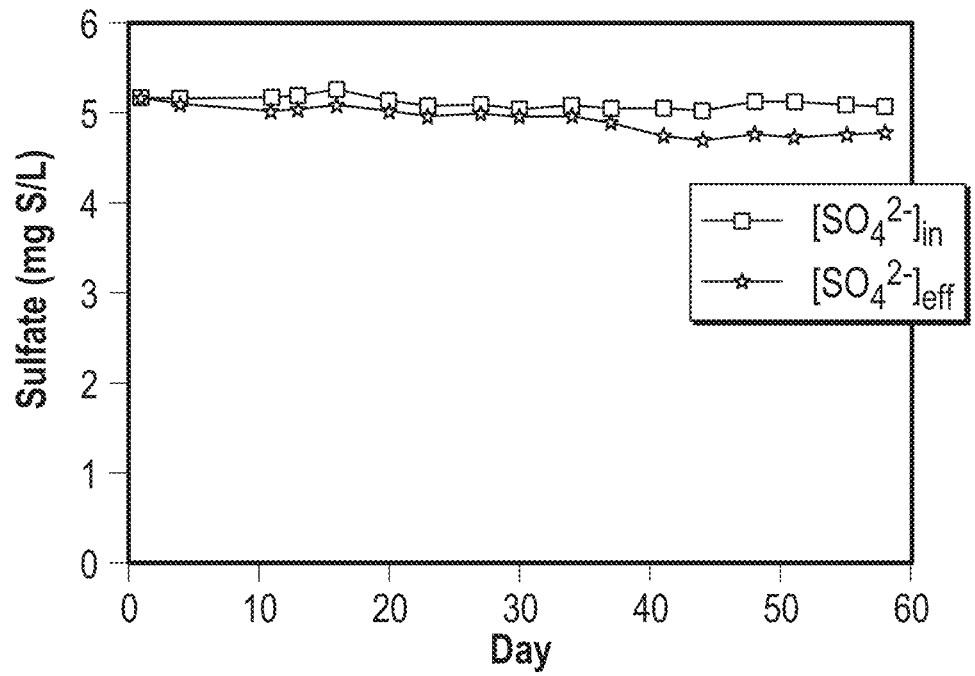
FIG. 9B is a graph that depicts the concentration of sulfur species in the bioelectrochemical reactor at the cathode in one embodiment of the present disclosure.

To understand the electron distribution in the anodic and cathodic chambers of the bioelectrochemical reactor at steady state, the concentrations of the electron donor (acetate) and a potential electron acceptor ($SO_4^{2-}$) in the influent and effluent of the anodic chamber are are plotted in FIG. 9A. The $SO_4^{2-}$ concentrations in the cathodic chamber are plotted in FIG. 9B. The methane concentration was only measured at steady state. During steady state, only a very small amount of sulfate was reduced to sulfide in the anode (~0.68 mg S/L) and cathode (~0.39 mg/L), and methane generation was negligible: 0.04±0.01 mg/L in the anode effluent and 0.01±0.004 mg/L in the cathode effluent. The reduction of sulfate was also due to the over-supply of the electron donor. The electron distribution in the anode and cathode at steady state are summarized in Table 2 below:

TABLE 2

Electron Distribution on Anode and Cathode of Bioelectrochemical Reactor

| Anode | | Cathode | |
| --- | --- | --- | --- |
| Component | Electron Distribution (%) | Component | Electron Distribution (%) |
| Current | 73% | Current | 0% |
| Biomass Synthesis and Others | 16% | Biomass Synthesis and Others | 59% |
| Sulfide | 10% | Sulfide | 8% |
| Methane | 1% | Methane | 0% |
| Sulfite | 0% | Sulfite | 0% |
| Elemental Selenium | 0% | Elemental Selenium | 27% |
| Selenide | 0% | Selenide | 6% |
| Selenite | 0% | Selenite | 0% |

The largest electron sink for the anode was found to be the generation of current with a coulombic efficiency of 73%. This value demonstrates a high efficient cathode-based bioelectrochemical system, which is comparable with values in the literature of other acetate-fed cathode systems.

Example 4—Separating Selenium Nanoparticles from Bacteria

A mixture of bacterial biomass and extracellular elemental selenium nanoparticles were produced in a fixed-bed biofilm biological reactor which consisted of an airtight plastic column containing plastic media (BioFlo 9, from Smoky Mountain Bio Media) for biofilm attachment. The column had an internal diameter of 2.3 cm, a length of 9 cm, and a working volume of 37 mL. The biologically treated water flowed downward to the bacterium-SeNP separator, which was made of a similar column as the biological reactor and placed beneath it. The bacterium-SeNP separator contained a polyethylene sheet tilted at 45° with a V-shaped opening at the lower end for the passage of bacteria after they rolled or slid down to the bottom of the separator. A tubing line was connected to the bottom of the separator for biomass sampling.

Figure 10:
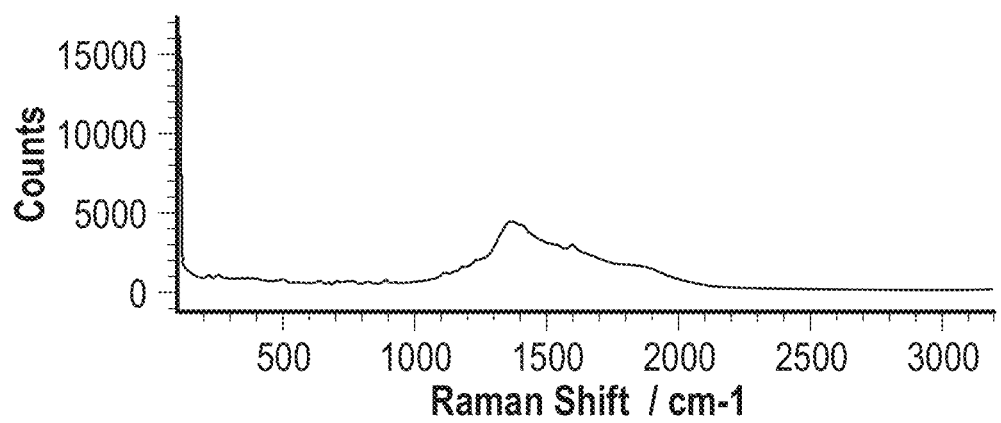
FIG. 10 is a graph that depicts Raman spectrometry of precipitates at the bottom of the separation column in one embodiment of the present disclosure.

While the water containing bacteria and nanoparticles was flowing above the plastic plate, the bacteria aggregated to form big flocs that rolled off the plate (due to gravity and/or fluid flow forces) while the selenium nanoparticles adhered to and stayed on the plate, achieving separation of nanoparticles from bacteria with no energy input. Raman spectroscopy confirmed the absence of selenium in the precipitate at the bottom of the separation column (FIG. 10).

Example 5—Further Separation of Selenium Nanoparticles from Bacteria

The effluent from the biological reactor was passed through the separator described in Example 4 above, such that SeNPs were collected on the sheet (polyethylene), and bacteria precipitated at the bottom of the separator. Water containing unsettled particles (SeNPs and bacteria) following the separation of Example 4 was collected and pumped through a Masterflex L/S 7554-80 peristaltic pump from Cole-Parmer into a mPES MicroKros tangential flow unit (TFU) from Spectrum Labs. The TFU included 6 hollow fibers with a length of 20 cm and an inner diameter of 0.5 mm for each fiber. The pore size of the fiber wall was 70 kD. These hollow fibers retained particles (bacteria and SeNPs), while allowing the treated water to pass through the fiber wall. Some of the retentate were trapped in the fiber wall while others were recirculated back into the biological reactor.

To understand the composition of the solid selenium in the effluent and the reactor, samples were taken from the system when steady state was reached Samples were taken from the polyethylene sheet and solid on it in the bacterium-SeNP separator, the precipitates at the bottom of the bacterium-SeNP separator, the retentate collected by filtering the system effluent (i.e., permeate through the TFU) through a membrane (nuclepore track-etched membranes, 15 nm, Whatman, USA).

Figure 11A:
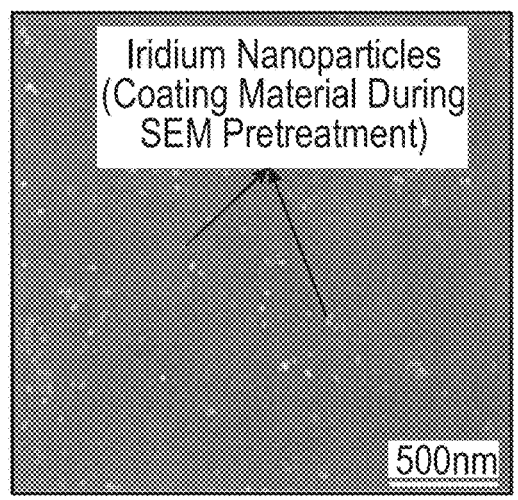
FIG. 11A is an SEM image of the retentate collected after passing the effluent of a system according to one embodiment of the present disclosure through a 15-nm pore-size membrane.
Figure 11B:
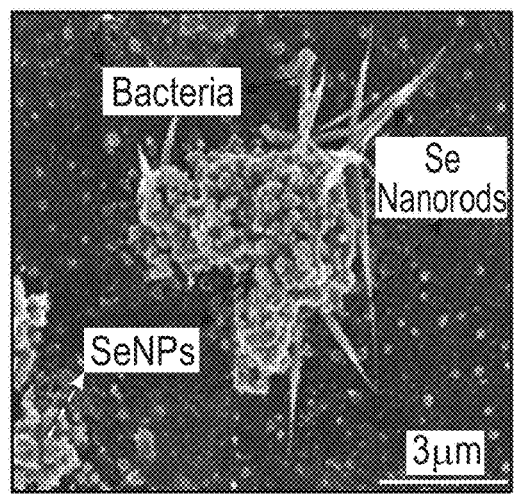
FIG. 11B is an SEM image of the polyethylene sheet from the bacterium-SeNP separator of a system according to one embodiment of the present disclosure.
Figure 11C:
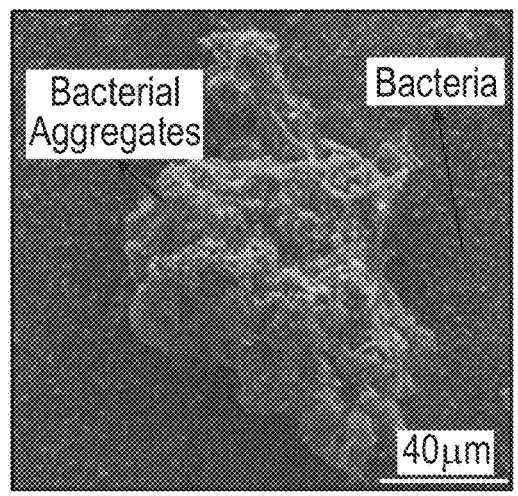
FIG. 11C is an SEM image of the precipitate at the bottom of the bacterium-SeNP separator of a system according to one embodiment of the present disclosure.
Figure 12A:
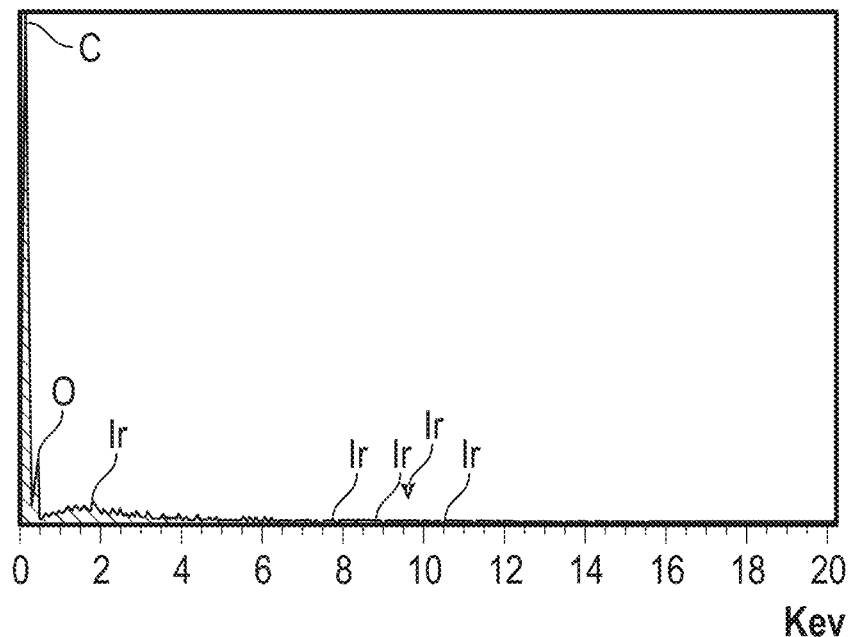
FIG. 12A illustrates the EDX spectra of the retentate collected after passing the effluent of a system according to one embodiment of the present disclosure through a 15 nm pore size membrane.
Figure 12B:
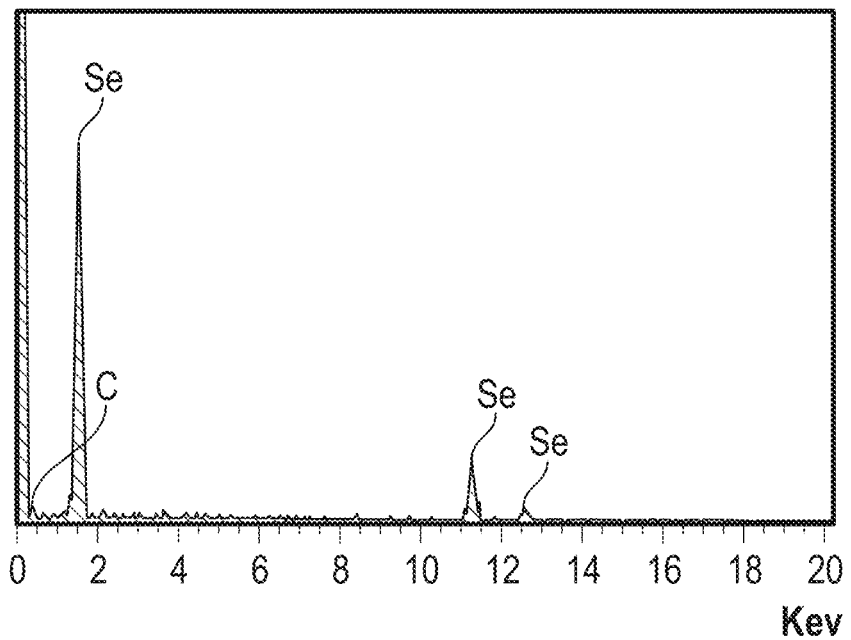
FIG. 12B illustrates the EDX spectra of nanoparticles on the polyethylene sheet of a system according to one embodiment of the present disclosure.
Figure 12C:
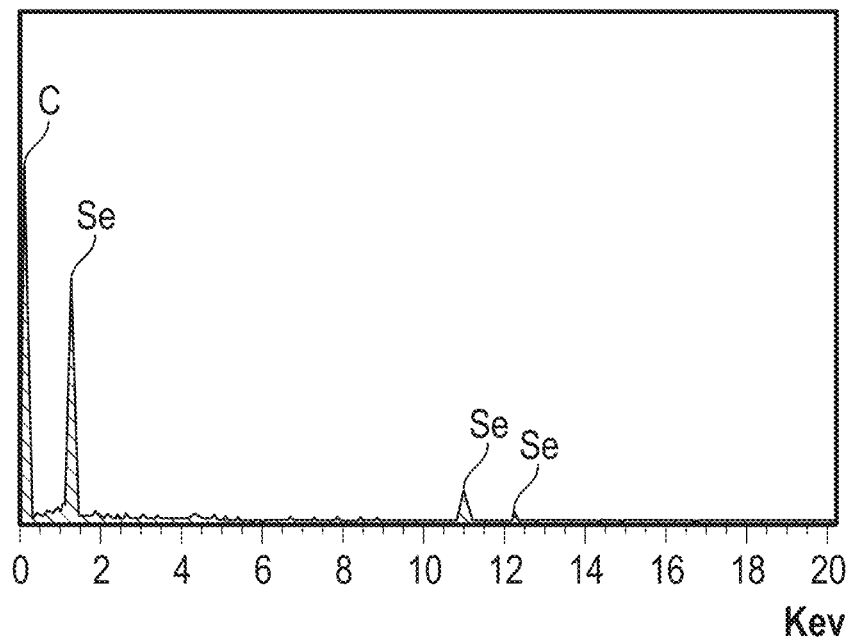
FIG. 12C illustrates the EDX spectra of nanorods on the polyethylene sheet of a system according to one embodiment of the present disclosure.
Figure 12D:
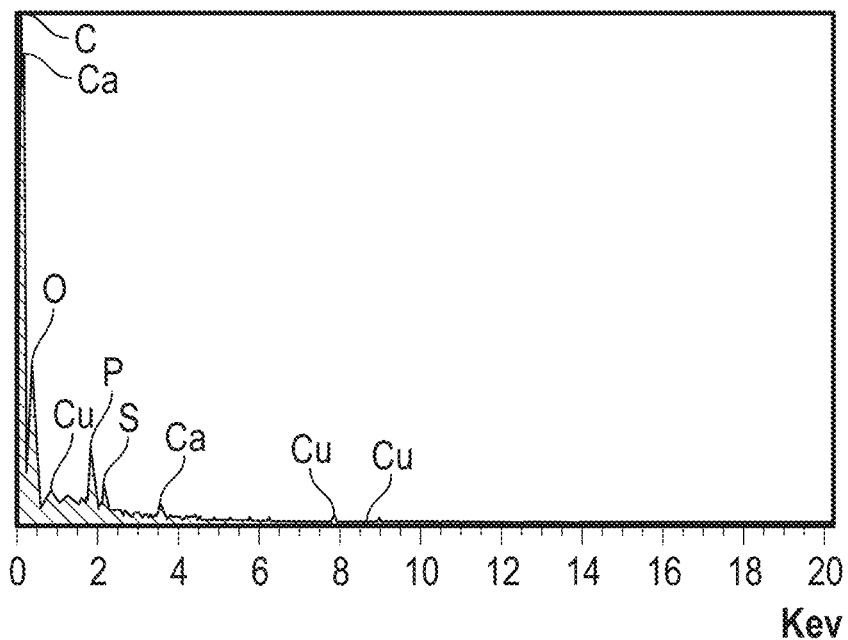
FIG. 12D illustrates the EDX spectra of the precipitate at the bottom of the bacterium-SeNP separator of a system according to one embodiment of the present disclosure.

FIGS. 11A-C show SEM images of the retentate collected after passing the system effluent through a 15-nm pore-size membrane (FIG. 11A), the polyethylene sheet from the bacterium-SeNP separator (FIG. 11B), and the precipitate at the bottom of the bacterium-SeNP separator (FIG. 11C). As these figures confirm, the system effluent contained only iridium nanoparticles, which were the result of the coating material used during SEM pretreatment. The polyethylene sheet included mainly SeNPs and Se nanorods. The precipitate at the bottom of the bacterium-SeNP separator contained only bacteria.

As is shown in FIG. 11B, the SeNPs were found as aggregates distributed evenly on the polyethylene sheet with diameters of less than about 5 µm, though some elemental selenium nanorods were embedded in the SeNP aggregations. Without intending to be bound by any particular theory, it is believed that the Se nanorods may have been the reaction products of SeNPs, which can precipitate as nanocrystallinites of trigonal Se (t-Se) and self-aggregate to form Se nanorods, a more stable form of elemental selenium. While bacteria appeared on the polyethylene sheet, they were negligible. As is shown in FIG. 11C, the precipitates in the bacterium-SeNP separator consisted mainly of bacterial aggregates with diameters of between about 50 µm and 300 µm, with very limited SeNPs, demonstrating good bacteria and SeNP separation. These results are confirmed by the EDX spectra shown in FIGS. 12A-D. Visual observations of the biological reactor and the polyethylene sheet confirm these observations. Over time, the polyethylene sheet in the bacterium-SeNP separator became more red, suggesting an accumulation of SeNPs on the polyethylene sheet.

Modifications and variations of the methods and devices described herein will be obvious to those skilled in the art from the foregoing detailed description. Such modifications and variations are intended to come within the scope of the appended claims.

We claim:

1. A bioelectrochemical reactor system for production of extracellular metal and metalloid nanoparticles, comprising:
   a bioelectrochemical reactor comprising:
      an anaerobic anode chamber which comprises a bacteria-coated anode;
      an anaerobic cathode chamber which comprises a bacteria-coated cathode;
      a cation exchange membrane in fluid communication with, and separating, the anode chamber and the cathode chamber;
      a source of an electron donor substance configured for supplying the electron donor substance into the anode chamber;
      a source of metal or metalloid ion-contaminated medium configured to pump the medium through the cathode chamber; and
      an external resistor in a circuit with the anode and the cathode, and
      a separator device which comprises a plate positioned in a flow of the medium exiting the cathode chamber, the plate comprising a plurality of pores to permit the passage of water but not the passage of nanoparticles or bacteria agglomerates, to separate the extracellular metal or metalloid nanoparticles from the medium,
      wherein the biochemical reactor is configured to reduce the metal or metalloid ions in the metal or metalloid ion-contaminated medium to extracellular metal or metalloid nanoparticles, wherein the metal or metalloid nanoparticles comprise selenium.

2. The bioelectrochemical reactor system of claim 1, wherein the electron donor substance comprises acetate, propionate, methanol, ethanol, or glucose.

3. The bioelectrochemical reactor system of claim 1, wherein the medium of the metal or metalloid ion-contaminated medium comprises water.

4. The bioelectrochemical reactor system of claim 1, wherein the metal ion comprises selenate ($SeO_4^{2-}$) or selenite ($SeO_3^{2-}$).

5. The bioelectrochemical reactor system of claim 1, further comprising a tangential flow filtration unit for separating the extracellular metal or metalloid nanoparticles and bacteria from the medium.

6. The bioelectrochemical reactor system of claim 1, wherein:
   the plate comprises a polymeric surface on which the nanoparticles will adhere, and
   the plate is angled relative to the flow of the medium such the bacteria will agglomerate and roll off of the plate.

7. The bioelectrochemical reactor system of claim 1, wherein the plate has an exterior surface which comprises polyethylene.

8. The bioelectrochemical reactor system of claim 1, wherein:
   the separator device comprises a vertically elongated vessel in which the plate is disposed,
   the vessel comprises an inlet about an upper end of the vessel for receiving the medium containing a mixture of bacteria and the nanoparticles, an outlet about an upper end of the vessel opposite the inlet for discharge of the medium from the vessel, and an outlet about the lower end of the vessel for discharge of biomass from the vessel.

9. A method for reducing metal or metalloid ions to extracellular metal or metalloid nanoparticles, the method comprising:
   providing the bioelectrochemical reactor system of claim 1;
   actuating the circuit to provide a voltage between the anode and the cathode; contacting the cathode and the anode with the metal or metalloid ion-contaminated medium; and
   feeding the electron donor substance into the anode chamber,
   wherein the contacting and feed rates are effective to cause extracellular metal or metalloid producing bacteria to reduce the metal or metalloid ions in the metal or metalloid ion-contaminated medium to extracellular metal or metalloid nanoparticles.

10. The method of claim 9, wherein the metal ion-contaminated medium is fed continuously through the cathode chamber.

11. The method of claim 9, wherein the electron donor substance is fed continuously through the anode chamber.

12. The method of claim 9, wherein the electron donor substance comprises an acetate, propionate, methanol, ethanol, or glucose; and wherein the medium of the metal or metalloid ion contaminated medium comprises water.

13. The method of claim 9, wherein the metalloid ion is selenate ($SeO_4^{2-}$) and the nanoparticles are selenium ($Se^0$).

14. The method of claim 9, wherein the flow rate of the electron donor is sufficient to maintain an amount equal to or higher than the stoichiometric ratio between electron donor and metal or metalloid ion.

* * * * *